Jan. 1, 1924

L. C. COOK 1,479,372

NONSKID DEVICE

Filed Oct. 11, 1922    2 Sheets-Sheet 1

WITNESSES
Guy M Spring
Chas R Smith

Inventor
LEROY C. COOK

By Richard B Owen, Attorney

Jan. 1, 1924
L. C. COOK
NONSKID DEVICE
Filed Oct. 11, 1922
1,479,372
2 Sheets-Sheet 2
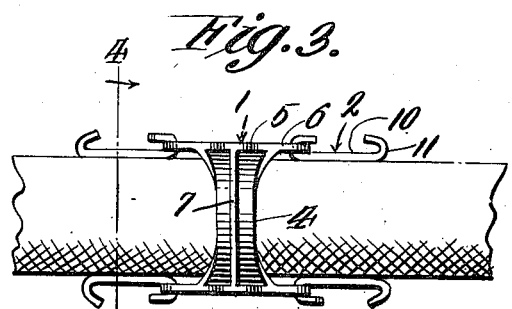
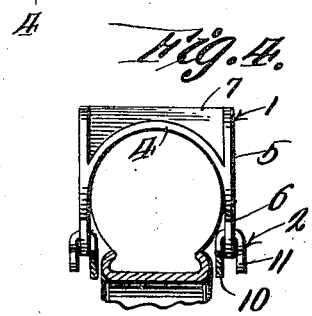
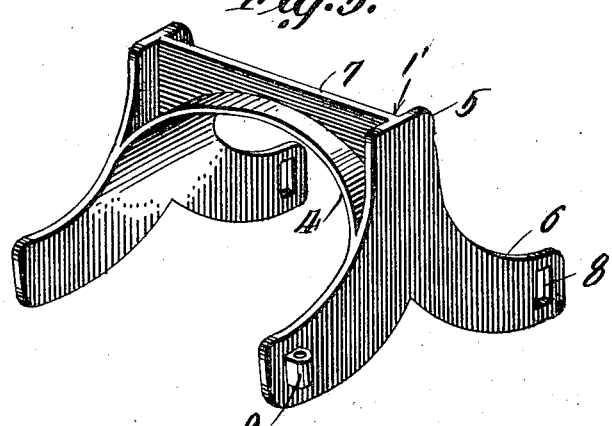
WITNESSES
Inventor
LEROY C. COOK
By Richard B. Owen, Attorney Patented Jan. 1, 1924.

1,479,372

UNITED STATES PATENT OFFICE.

LEROY C. COOK, OF DEER RIVER, MINNESOTA.

NONSKID DEVICE.

Application filed October 11, 1922. Serial No. 593,789.

*To all whom it may concern:*

Be it known that I, LEROY C. COOK, a citizen of the United States, residing at Deer River, in the county of Itasca and State of Minnesota, have invented certain new and useful Improvements in a Nonskid Device, of which the following is a specification.

This invention relates to improvements in anti-slipping devices for vehicle wheels, and particularly the wheels of automobiles and trucks.

The principal object of the invention is the peculiar construction of a shoe or gripping member which is to be attached to the tire of a vehicle wheel.

Another object of the invention is the provision of means for facilitating the passage of a wheel over slippery, icy or muddy ground, and in climbing or descending a grade.

Another important object of the invention is to provide a device of this nature which will be simple and efficient in construction, reliable in operation, durable, inexpensive to manufacture and well adapted to the purpose for which it is designed.

A still further object of the invention is to provide simple and efficient means for quickly connecting the two together.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

In the drawings:—

Figure 3 is a plan view of a portion of a vehicle wheel showing a portion of my device applied thereto, Figure 4 is a section taken substantially on the line 4—4 of Fig. 3.

Figure 5 is a perspective of the end shoe or lug,

Figure 1:
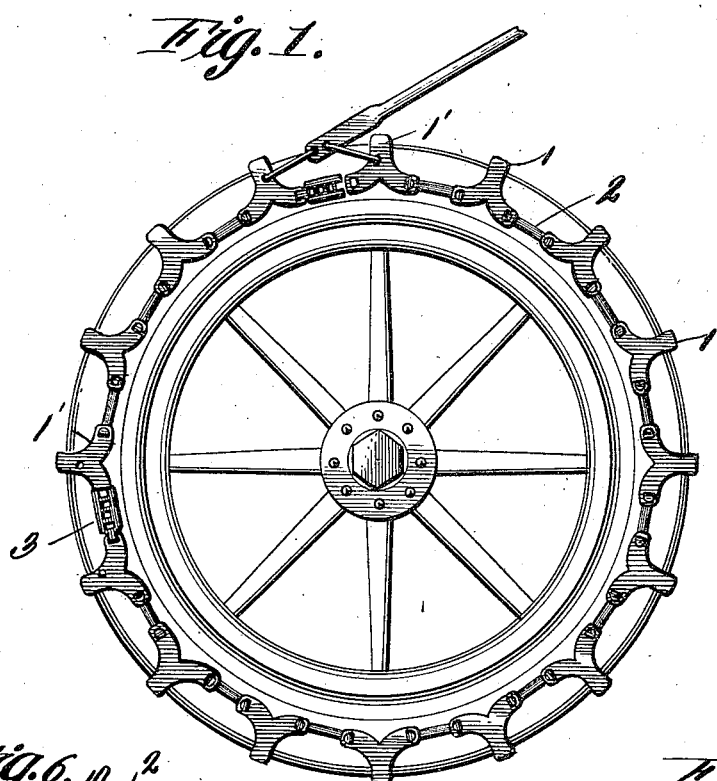
Figure 1 is a side elevation of a vehicle wheel showing my non-skid device applied thereon.

Referring to the drawing in detail it will be seen that the non-skid device consists of a plurality of shoes 1 connected by links 2 except at suitable points where adjustable links 3 are used. Each shoe or lug consists of a curved body 4 adapted to rest on the periphery of the tire on the vehicle wheel and the ends of this body are connected to plates 5 which are adapted to be disposed vertically when in use. Each plate 5 is provided at its lower end with the diverging wings 6. The upper ends of the plates 5 are connected by the rib 7, the lower edge thereof conforming with the outer periphery of the body 4, while the upper edge thereof is straight and flush with the upper edge of the plates 5. The shoes 1 are provided with slots at the ends of the wings 6 forming part of the plates 5 while the shoes 1' have a slot 8 at the end of one wing 6 and an apertured projection or lug 9 at the end of the other wing.

Figure 6:
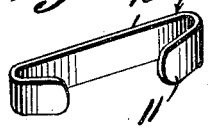
Figure 6 is a perspective of one of the links of the device.
Figure 7:
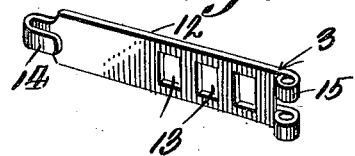
Figure 7 is a perspective of the connecting link.
Figure 2:
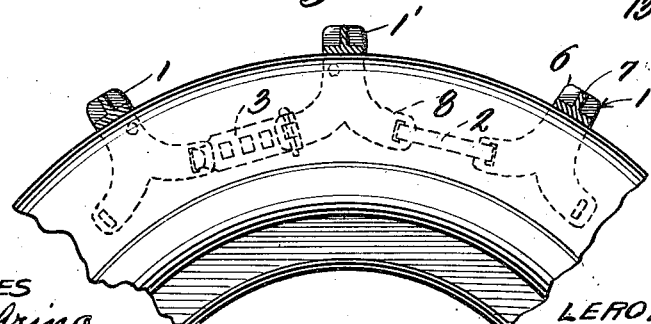
Figure 2 is a fragmentary enlarged elevation of the wheel showing my device in section applied thereto.

The main links 2 as is shown to advantage in Fig. 6 include a body 10 which is straight having its ends curved so as to form hooks 11 on the same side of the body. These hooks engage the slots 8 of the shoes or lugs 1 and 1'. The adjustable links 3, as is shown to advantage in Fig. 7 include a body 12 having a plurality of slots 13 therein, and one end of the plate is curved to form a hook 14 while the other end thereof is provided with a pair of spaced apertured ears 15 between which is received the apertured lug 9 of the shoes 1'. A cotter pin is adapted to extend through the ears 15 and lug 9 ordinarily. If, however, it becomes necessary to tighten the non-skid device on the wheel, the lug 9 may be passed through any of the slots 13 on the links 3 and pins passed through the lug so as to prevent its accidental removal from the slots 13. In tightening the chain any suitable device such as is shown in Fig. 1 may be used.

Having thus described my invention what I claim is:—

1. A non-skid shoe of the class described including a curved body, a pair of plates at the ends of the body including diverging extensions at their inner ends, and a rib mounted on the outer face of the body between the plates, the outer edge thereof being straight and flush with the outer edges of the plates.

2. An anti-skid shoe of the class described comprising a curved body, a pair of plates attached to the ends of the curved body and disposed transversely thereof, one on each end thereof, and a rib on the outer side of the curved body extending between the plates, the outer edges of said plates and said rib being straight and disposed in coplanar relation with each other.

In testimony whereof I affix my signature in presence of two witnesses.

LEROY C. COOK.

Witnesses:
S. J. MORAN,
EMMA SCHMEDEKE.